3,198,821
ARYL (ISOTHIOCYANATOALKOXYLATES)
Thomas K. Brotherton, South Charleston, and John W. Lynn, Charleston, W. Va., assignors to Union Carbide Corporation, a corporation of New York
No Drawing. Filed Apr. 27, 1962, Ser. No. 190,768
3 Claims. (Cl. 260—454)

The present invention relates to (isothiocyanatoalkyl)-ethers and their corresponding alkali and alkaline earth metal (dithiocarbamatoalkyl)ethers. More specifically, the present invention relates to (isothiocyanatoalkyl)-ethers, the alkali and alkaline earth metal (dithiocarbamatoalkyl)ethers which are intermediates in the preparation of the (isothiocyanatoalkyl)ethers and methods for producing these compounds. The compounds of the present invention possess high biological activity and are particularly useful as fungicides.

The (isothiocyanatoalkyl)ethers of the present invention are those having the structures as represented by Formulae 1, 2, 3, 4, and 5 below:

(1)    $SCN—(C_aH_{2a})—O—(C_aH_{2a})—NCS$ wherein $a$ is an integer having a value of from 3 to 10 inclusive, and preferably from 3 to 5 inclusive. Illustrative of $(C_aH_{2a})$ groups are the following alkylene groups: trimethylene, 1,2-butylene, 1,3-butylene, tetramethylene, pentamethylene, 1,2-pentylene, 1,3-pentylene, 1,4-pentylene, hexamethylene, 2-ethylhexamethylene, octamethylene, nonamethylene, decamethylene, and the like. Typical of such compounds is 4-oxa-1,7-di(isothiocyanatoheptane) the preparation of which is shown by Example IV below:

(2)
  $SCN—(C_bH_{2b})—O—(C_dH_{2d}—O)_m—(C_bH_{2b})—NCS$ wherein $b$ is an integer having a value of from 1 to 10 inclusive, and preferably from 2 to 5 inclusive, $d$ is an integer having a value of from 1 to 10 inclusive, and preferably from 1 to 4 inclusive, $m$ is an integer having a value of from 1 to 60,000 inclusive and preferably from 1 to 150 inclusive. Illustrative of the $(C_bH_{2b})$ and $(C_dH_{2d})$ groups are the following alkylene groups: methylene, ethylene, trimethylene, 1,2-butylene, 1,3-butylene, tetramethylene, pentamethylene, 1,2-pentylene, 1,3-pentylene, 1,4-pentylene, hexamethylene, 2-ethylhexamethylene, octamethylene, nonamethylene, decamethylene, and the like. Typical of such compounds is 4,7,10-trioxa-5,9-dimethyl-1,13-di - (isothiocyanato)tridecane, the preparation of which is shown by Example 3 below:

(3)    $G[O—(C_eH_{2e})—NCS]_n$ wherein $e$ is an integer having a value of from 1 to 10 inclusive, and preferably from 2 to 5 inclusive, $n$ is an integer having a value of from 3 to 8 inclusive and preferably from 3 to 6 inclusive, and G represents a polyvalent aliphatic hydrocarbon group generally containing from 3 to 12 carbon atoms inclusive and preferably containing from 3 to 6 carbon atoms inclusive. Illustrative members of the $(C_eH_{2e})$ group are the same as defined for the $(C_bH_{2b})$ group above.

Illustrative of the polyvalent hydrocarbon groups represented by G are the following polyvalent alkanes: 1,2,3-propanetriyl, 1,2,3-butanetriyl, 1,2,4-butanetriyl, 1,2,3,4-butanetetra-yl, tri(methylene)methane, 2-methyl-1,2,3-propanetriyl, 2 - methylene-1,2,3-propanetriyl, 1,2,5-pentanetriyl, 1,3,5-pentanetriyl, 1,2,3,4-pentanetetra-yl, 1,2,3,5-pentanetetra-yl 1,2,4,5-pentanetetra-yl, 1,2,3,4,5-pentanepenta-yl, tetra(methylene)methane, and the like. Typical of such compounds is tetra-(3-isothiocyanatopropoxymethyl)methane, the preparation of which is shown by Example 3 below.

(4)    $A[O—C_fH_{2f})—NCS]_y$ wherein $f$ is an integer having a value of from 1 to 10 inclusive and preferably from 2 to 5 inclusive, $y$ is an integer having a value of from 2 to 6 inclusive and preferably having a value of from 2 to 4 inclusive and A is a polyvalent cycloaliphatic hydrocarbon group generally containing from 3 to 6 carbon atoms inclusive and preferably containing from 5 to 6 carbon atoms inclusive.

Illustrative members of the $(C_fH_{2f})$ group are the same as defined for the $(C_bH_{2b})$ group above.

Exemplary of the cycloaliphatic hydrocarbon groups represented by A are:

1,2-cyclopropanediyl,
1,2,3-cyclopropanetriyl,
1,2-cyclobutanediyl,
1,3-cyclobutanediyl,
1,2,3-cyclobutanetriyl,
1,2,3,4-cyclobutanetetra-yl,
1,2-cyclopentanediyl,
1,3-cyclopentanediyl,
2-methyl-1,3-cyclopentanediyl,
1,2,3-cyclopentanetriyl,
1,3,4-cyclopentanetriyl,
1,2,3,4-cyclopentanetetra-yl,
1,2,3,4,5-cyclopentanepenta-yl,
1,2-cyclohexanediyl,
3-ethyl-1,2-cyclohexanediyl,
1,3-cyclohexanediyl,
1,4-cyclohexanediyl,
1,2,3-cyclohexanetriyl,
1,3,4-cyclohexanetriyl,
1,3,5-cyclohexanetriyl,
1,2,3,4-cyclohexanetetra-yl,
1,3,4,5-cyclohexanetetra-yl,
1,2,3,4,5-cyclohexanepenta-yl,
1,2,3,4,5,6-cyclohexanehexa-yl and the like; typical of such compounds is 1,2,3,4,5,6-hexa-(3-isothiocyanatopropoxy)cyclohexane, the preparation of which is shown by Example 2 below.

(5)    $B[O—(C_kH_{2k})—NCS]_z$ wherein $k$ is an integer having a value of from 1 to 10 inclusive, and preferably from 2 to 5 inclusive, $z$ is an integer having a value of from 2 to 6 inclusive and preferably from 2 to 4 inclusive, and B is a polyvalent aromatic hydrocarbon group generally containing from 6 to 14 carbon atoms inclusive, and preferably containing from 6 to 10 carbon atoms inclusive.

Illustrative members of the $(C_kH_{2k})$ group are the same as defined for the $(C_bH_{2b})$ group above.

Illustrative of the polyvalent aromatic hydrocarbon groups represented by B are: 1,2-phenylene, 1,3-phenylene, 1,4-phenylene, 1,2,3-phenenyl, 1,2,4-phenenyl, 1,3,5-phenenyl, 1,2,3,4-benzenetetra-yl, benzenepenta-yl, benzenehexa-yl, 4,4'-diphenylene, 1,4-bis(ethylene)benzene, 2,2-bis(p-phenylene)propane and the like. Typical of such compounds is 2,2-bis[p(3-isothiocyanatopropoxy)phenyl]propane, the preparation of which is shown by Example 1 below.

G, A and B can be substituted by functional groups. Illustrative of such groups are nitro, halo, e.g., fluoro, chloro, bromo, iodo; cyano and like.

Alkali metal and alkaline earth metal (dithiocarbamatoalkyl)ethers of the present invention are those represented by Formulae 6, 7, 8, 9, and 10 below:

(6)

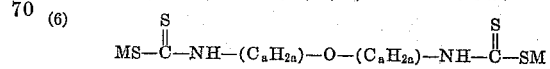

wherein M is an alkali or alkaline earth metal ion and $a$ has been previously defined; compounds represented by Formula 6 are intermediates in the preparation of the compounds represented by Formula 1 above;

(7) 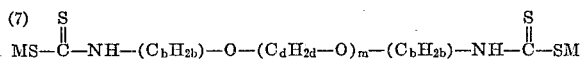
$$MS-\overset{S}{\underset{\|}{C}}-NH-(C_bH_{2b})-O-(C_dH_{2d}-O)_m-(C_bH_{2b})-NH-\overset{S}{\underset{\|}{C}}-SM$$

wherein $m$ is an alkali or alkaline earth metal ion and $b$, $d$, and $m$ have been previously defined; compounds represented by Formula 7 are intermediates in the preparation of compounds represented by Formula 2 above;

(8) 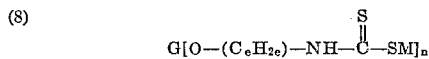
$$G[O-(C_eH_{2e})-NH-\overset{S}{\underset{\|}{C}}-SM]_n$$

wherein M, G, $e$ and $n$ have been previously defined; compounds represented by Formula 8 are intermediates in the preparation of compounds represented by Formula 3 above;

(9) 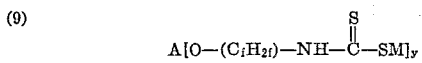
$$A[O-(C_fH_{2f})-NH-\overset{S}{\underset{\|}{C}}-SM]_y$$

wherein A, M, $f$ and $y$ have been previously defined; compounds represented by Formula 9 are intermediates in the preparation of compounds represented by Formula 4 above; and

(10) 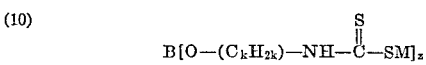
$$B[O-(C_kH_{2k})-NH-\overset{S}{\underset{\|}{C}}-SM]_z$$

wherein B, M, $k$ and $z$ have been previously defined; compounds represented by Formula 10 are intermediates in the preparation of compounds represented by Formula 5 above.

The (dithiocarbamatoalkyl)ethers of the present invention can be prepared from poly(aminoalkyl)ethers having structures as represented by Formulae 11, 12, 13, 14, and 15 below:

(11)  $H_2N-(C_aH_{2a})-O-(C_aH_{2a})-NH_2$ wherein $a$ has been previously defined; amines represented by Formula 11 are used in the preparation of the alkali or alkaline earth metal (dithiocarbamatoalkyl)ethers represented by Formula 6 above;

(12)  $H_2N-(C_bH_{2b})-O-(C_dH_{2d}-O)_m-C_bH_{2b})-NH_2$ wherein $b$, $d$, and $m$ have been previously defined; amines represented by Formula 12 are used in the preparation of the alkali or alkaline earth metal (dithiocarbamatoalkyl)ethers represented by Formula 7 above;

(13)  $G[O-(C_eH_{2e})-NH_2]_n$ wherein G, $e$, and $n$ have been previously defined; amines represented by Formula 13 are used in the preparation of the alkali or alkaline earth metal (dithiocarbamatoalkyl) ethers represented by Formula 8 above;

(14)  $A[O-(C_fH_{2f})-NH_2]_y$ wherein A, $f$ and $y$ have been previously defined; amines represented by Formula 14 above are used in the preparation of the alkali or alkaline earth metal (dithiocarbamatoalkyl)ethers represented by Formula 9 above; and

(15)  $B[O-(C_kH_{2k})-NH_2]_z$ wherein B, $k$, and $z$ have been previously defined; amines represented by Formula 15 are used in the preparation of the alkali or alkaline earth metal (dithiocarbamatoalkyl) ethers represented by Formula 10 above.

The preparation of the amines illustrated by Formulae 11 through 15 inclusive is well-known in the art. One method for preparing these amines is by first forming a nitrile through the reaction of a polyhydric alcohol or phenol with a cyanoalkene, utilizing the methods disclosed in U.S. Patents 2,352,671 to Walker, issued July 4, 1944, 2,383,443 and 2,401,607 both to Bruson, issued August 28, 1945, and June 4, 1946 respectively; and thereafter hydrogenating the nitrile, under pressure, in the presence of a catalyst such as Raney nickel, to form the amine.

The following reaction diagrams are illustrative of the preparation of polyamines falling within the scope of Formulae 11 through 15.

REACTION A

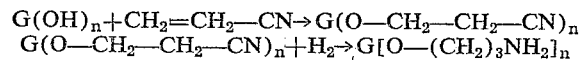
$$G(OH)_n + CH_2=CH-CN \rightarrow G(O-CH_2-CH_2-CN)_n$$
$$G(O-CH_2-CH_2-CN)_n + H_2 \rightarrow G[O-(CH_2)_3NH_2]_n$$

wherein G and $n$ have been previously defined.

The alkali metal and alkaline earth metal (dithiocarbamatoalkyl)ethers of the present invention, as represented by Formulae 6 through 10 inclusive, are prepared by reacting amines such as represented by Formulae 11 through 15 inclusive, with an alkali metal or alkaline earth metal hydroxide and carbon disulfide.

The following reaction diagram is representative of the preparation of the alkali metal and alkaline earth metal (dithiocarbamatoalkyl)ethers of the present invention.

REACTION B

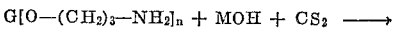
$$G[O-(CH_2)_3-NH_2]_n + MOH + CS_2 \longrightarrow$$

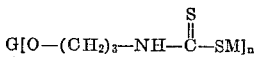
$$G[O-(CH_2)_3-NH-\overset{S}{\underset{\|}{C}}-SM]_n$$

wherein G and $n$ have been previously defined and MOH is an alkali metal or alkaline earth metal hydroxide.

Carbon disulfide is generally used in an amount of from about 1 mole to about 5 moles, per mole equivalent of the polyamine used, based upon the number of primary amine groups on the polyamine and preferably from about 1 mole to about 3 moles, per mole equivalent of the polyamine based upon the number of primary amine groups. While an amount of carbon disulfide greater than about 5 moles per mole equivalent of the polyamine can be used, it is not desirable as it unduly increases production costs.

The alkali or alkaline earth metal hydroxide is generally used in an amount of from about 1 mole to about 3 moles, per mole equivalent of polyamine based upon the number of primary amine groups on the polyamine and preferably from about 1 mole to about 1.1 moles per mole equivalent based upon the number of primary amine groups. While an amount of alkali or alkaline earth metal hydroxide greater than about 3 moles per mole equivalent of the polyamine can be used, it is not desirable as it unduly increases production costs.

Exemplary of suitable alkali metal hydroxides are lithium hydroxide, potassium hydroxide, sodium hydroxide and the like. Among suitable alkaline earth metal hydroxides are barium hydroxide, calcium hydroxide, strontium hydroxide and the like.

It has been found preferable to use the hydroxide as an aqueous solution as it permits greater temperature control. When the hydroxide is utilized as a aqueous solution it can be used in concentrations of from 5 to 85 percent. The hydroxide is generally first admixed with the polyamine and the carbon disulfide then added to the hydroxide-polyamine mixture although the order of admixture is not critical.

This reaction is generally conducted at a temperature of from about 20° C. to about 120° C. and preferably at a temperature of from about 90° C. to about 110° C. The reaction mixture is generally maintained at this temperature for a period of from about 5 to about 30 minutes.

This reaction can be conducted at atmospheric or superatmospheric pressure with atmospheric pressure being preferred.

Diluents can be used in conducting the reaction provided they are non-reactive in respect to the reactants and the products.

Suitable diluents include water; aromatic hydrocarbons such as benzene, toluene, xylene and the like; aliphatic hydrocarbons such as hexane, heptane, octane, nonane and the like; halogenated hydrocarbons such as chloroform, carbon tetrachloride, chlorobenzene, and the like; ethers such as methyl ether, ethyl ether, biphenyl ether and the like; sulfones such as isopropyl sulfone, butyl sulfone, pentyl sulfone and the like.

The alkali or alkaline earth (dithiocarbamatoalkyl)-ethers can be isolated by any convenient means. For example, in those instances wherein a diluent is used, the product can be recovered by evaporating the diluent.

The (isothiocyanatoalkyl)ethers of the present invention, as represented by Formulae 1 through 5 inclusive, can be prepared by reacting an alkali or alkaline earth metal (dithiocarbamatoalkyl)ether as represented by Formulae 6 through 10 inclusive, with a chloroformate of the formula:

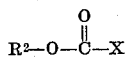

wherein X is a halogen group, such as fluoro, chloro, bromo or iodo, and $R^2$ is a monovalent hydrocarbon group generally containing from 1 to 14 carbon atoms inclusive. Illustrative of such monovalent hydrocarbon groups are alkyl groups generally containing from 1 to 6 carbon atoms inclusive, such as methyl, ethyl, propyl, isopropyl, isobutyl, butyl, pentyl, and the like; aryl groups generally containing from 6 to 14 carbon atoms inclusive, such as phenyl, tolyl, xylyl, naphthyl and the like; and aralkyl groups generally containing from 7 to 14 carbon atoms inclusive, such as benzyl, phenethyl and the like.

The following reaction diagram is representative of the preparation of the (isothiocyanatoalkyl)ethers of the present invention:

REACTION C

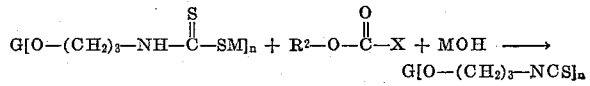

wherein G, $n$, M, X, and $R^2$ have been previously defined.

In the preparation of the (isothiocyanatoalkyl)ethers, the alkali or alkaline earth metal (dithiocarbamatoalkyl)ether is admixed with an alkali or alkaline earth metal hydroxide and to this mixture is then added a haloformate which has been previously defined. The reaction mixture is heated to and maintained at a temperature of from about 0° C. to about 100° C. and preferably from about 20° C. to about 35° C. After the reaction mixture has attained the desired reaction temperature, the reaction mixture is agitated for a period of from about 30 to about 180 minutes during which period the reaction temperature is maintained.

The haloformate is generally used in an amount of from about 1 to about 3 moles per mole equivalent of alkali or alkaline earth metal (dithiocarbamatoalkyl)ether, based upon the number of dithiocarbamato groups present on the aforementioned (dithiocarbamatoalkyl)ether and is preferably used in an amount of from about 1 mole to about 1.2 moles per mole equivalent of the (dithiocarbamatoalkyl)ether, based upon the number of dithiocarbamato groups present on the aforementioned (dithiocarbamatoalkyl)ether. While an amount of haloformate greater than about 3 moles per mole equivalent can be used, it is not economically feasible as it unduly increases the cost of production.

The alkali or alkaline earth metal hydroxide is used in an amount sufficient to create and maintain in the reaction mixture a pH greater than 7.0 and preferably greater than 7.1 throughout the entire reaction period.

If desired, the reaction product liquor of Reaction B can be used directly without the separation of the (dithiocarbamatoalkyl)ether. When this reaction product liquor is used, a sufficient amount of alkali or alkaline earth metal hydroxide is added, if necessary, to create and maintain a pH greater than 7.0 and preferably greater than 7.1 throughout the entire reaction period.

Diluents can be used in conducting the reaction provided they are non-reactive in respect to the reactants and the products. Suitable diluents are the same as described above for use in the dithiocarbamate preparation i.e., Reaction B.

Although it is preferred to conduct the reaction at atmospheric pressure, that is about 14.9 pounds per square inch, this reaction can be conducted at superatmospheric pressure, provided, of course, proper pressure equipment is used.

After the reaction has been completed, the product, (isothiocyanatoalkyl)ether, is recovered by decantation and distillation or other appropriate conventional means known to the art. The product can be purified by distillation, if so desired.

An alternative method for preparing the (isothiocyanatoalkyl)ethers represented by Formulae 1 through 5 inclusive, has been found to be through the direct reaction of thiophosgene with the desired polyamine. This method of preparing these compounds has the advantage that it is a one step process.

In conducting this process, a polyamine illustrated by Formulae 11 through 15 inclusive, is generally dissolved in a suitable diluent in a concentration of from about 5 to about 30 percent by weight and preferably the polyamine is present in a concentration of from about 10 to about 20 percent by weight based on the weight of the diluent and the polyamine.

Diluents which can be used should serve as a solvent common to both the polyamine and the thiophosgene and be non-reactive to both as well as the product (isothiocyanatoalkyl)ether. Suitable diluents include: o-dichlorobenzene, 1,2-dichloropropane, benzene, toluene, xylene, diethylether, ethyl acetate and the like.

Thiophosgene is sparged through this solution at a rate of from about 0.1 to about 5 moles per hour per mole of polyamine for a period of from two to twenty hours.

During this period of thiophosgene introduction the temperature of the reaction mixture is maintained at from about 60° C. to about 200° C., and preferably at a temperature of from about 90° C. to about 150° C.

The product (isothiocyanatoalkyl)amine is generally recovered as an oily liquid from the reacted mixture by any suitable separation procedure, e.g., decantation, distillation, and the like.

This reaction may be conducted at subatmospheric, atmospheric or superatmospheric pressure provided the pressure under which the phosgene is introduced is always greater than the pressure under which the reaction is conducted.

The compounds of the present invention, both the (isothiocyanatoalkyl)ethers and the alkali or alkaline earth (dithiocarbamatoalkyl)ethers as exemplified by Formulae 1 through 10 inclusive, exhibit a high degree of biological activity and are particularly useful as fungicides. These compounds can be used as agricultural fungicides or incorporated in nutrients such as agar to prevent fungus growth. To facilitate dispersion of these compounds it has been found desirable to first dissolve them in acetone and utilize the acetone solution in compounding fungicidal compositions.

When utilized as agricultural fungicides, these compounds are preferably applied in conjunction with a diluent or an extender. The extender may be either a liquid or a powdered solid. For application as dusting compositions, the compounds may be so admixed with finely divided solid inert materials as to provide homogeneous free-flowing dusts. The usual pulverized inert materials can be used, preferably talcs, neutral clays, pyrophyllite, diatomaceous earth, cottonseed flour, or any other flours. Other inert solid carriers are: magnesium or calcium carbonates, calcium phosphate, and the like, either in powder or granular form.

The percent by weight of the essential active ingredient will vary according to the manner in which the composition is be to applied, but, in general, will be from about 0.5 to about 95 percent by weight of the dust. The preferred percentage range of the active essential ingredient is from about 25 to about 75 percent by weight, based upon the total weight of the dusting composition. The inert carriers may be substituted in whole or in part by other materials when it is desired to apply the fungicidal compositions to the soil, for instance fertilizers, soil conditioners, and the like.

Liquid fungicidal compositions are preferably applied with water as the extender, as the compounds of the present invention are highly stable as aqueous dispersions; the amount of water used depends principally upon the convenience to the agriculturist and upon the type of spraying apparatus which he customarily uses. Sprays which are toxic to fungi usually contain from about 0.1 to about 95 percent by weight of the active essential ingredient based upon the total weight of the spray and preferably contain from about 25 to about 85 percent by weight of the active essential ingredient based upon the total weight of the spray.

In the case of aqueous sprays, it is desirable to have the fungicidal compound in homogeneous dispersion and for this purpose a surface-active agent is preferably used. Substantially any wetting, emulsifying, dispersing or penetrating agent can be used whether anionic, cationic or nonionic. The preferred sprays contain the fungicidal compound with from about 0.1 percent to about 15 percent by weight of a surface-active agent with a sufficient amount of the fungicidal compound and water to make 100 parts by weight. For general use, the weight of surface-active agent will be from about 5 percent to about 10 percent of the weight of the active ingredient in the spray. Suitable surface-active agents are, for example, sodium and potassium oleates, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid, alkylnaphthalene, sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and octylphenol, polyvinyl alcohols, salts, such as acetates of polyamines derived from reductive amination of ethylene-carbon monoxide polymers, laurylamine hydrochloride, lauryl pyridinium bromide, stearyltrimethyl-ammonium bromide, cetyldimethylbenzyl ammonium chloride, lauryldimethylamine oxide, and the like.

The compounds contemplated herein can be used with or without "addends," for instance, insecticides, such as rotenone, "DDT," or nicotine sulfate, or those addends which cause the fungicides to adhere evenly and strongly to plant foliage, such as methyl cellulose.

When the compounds are incorporated into nutrient compositions, they may be introduced as an acetone-water dispersion containing a surface-active agent. Suitable surface-active agents have been heretofore described under agricultural fungicides.

Tests were performed in order to evaluate the fungicidal activity of the compounds of the present invention.

*Biological tests performed*

(A) *Bean mildew test.*—Greenhouse tests were conducted using compounds of this invention for control of powdery mildew of beans caused by the fungus *Erysiphe polygoni*.

Aqueous suspensions of the test compound were prepared by dissolving the compound in acetone, incorporating sorbitol laurate as an emulsifying agent and diluting the solution with water. Six individual bean plants of about 7 days of age, with primary leaves expanded, which had been inoculated 48 hours previously by dusting with the fungus *Erysiphe polygoni* were sprayed for 30 seconds each with the aqueous suspension of the test compound. An additional six bean plants which had also been inoculated with the fungus 48 hours earlier were sprayed with an equal amount of acetone-emulsifier-water solution, and maintained under identical conditions as controls. All plants were then placed in a greenhouse and after 7 to 10 days were examined for mildew. At the end of the test period the control plants showed 90 to 100 percent of leaf surface covered with mildew. The efficacy of the test compounds was determined by the use of the following equation:

$$E = \frac{L_c - L}{L_c} \times 100$$

wherein:

$E$ = efficiency of the test compound in percent.
$L_c$ = the average number of lesions per control plant.
$L$ = the average number of lesions per plant sprayed with test compound.

Compound evaluated: Efficiency in percent
Sodium 4,7-dioxa-1,10-bis-(dithiocarbamato)decane
at a concentration of—
  1000 parts per million _____ 100
  100 parts per million _____ 100

4,7-dioxa-1,10-diisothiocyanato-decane at a concentration of—
  1000 parts per million _____ 100
  100 parts per million _____ 100

4,12-dioxa-1,15-diisothiocyanato-pentadecane at a concentration of—
  1000 parts per million _____ 100
  100 parts per million _____ 95

4,7,10-trioxa-5,9-dimethyl-1,13-di(isothiocyanato)tridecane at a concentration of—
  1000 parts per million _____ 100
  100 parts per million _____ 90

4-oxa-1,7-diisothiocyanatoheptane at a concentration of—
  1000 parts per million _____ 100
  100 parts per million _____ 100

*Fungicide agar incorporation test*

(B) Each test compound was dissolved in an acetone solution of sorbitol laurate, an emulsifying agent. These solutions were then diluted with water to give two test solutions having a concentration of 1000 parts per million and 100 parts per million respectively.

The agar nutrient used had the following composition:

Grams
Potato dextrose sugar _____ 45
Bacto agar _____ 5
Distilled water _____ 1000

This composition was prepared by dissolving the solid ingredients in the distilled water by heating in a steam oven. Eighteen milliliter aliquots of the nutrient solution were placed in 50 milliliter Erlenmeyer flasks and were sterilized by heating in an autoclave for 20 minutes.

The nutrient media aliquots were melted, then cooled to a temperature of from 50° C. to 60° C. and 2 milliliters of the test solutions prepared from the selected test compound, were added. The flasks were agitated to insure uniform dispersion and the nutrient media containing the selected test compound was immediately transferred to sterile Petri dishes. Media were prepared for each test compound in an amount sufficient to test each test organism.

The test was carried out for the following test organisms:

(1) *Fusarium gladiola*
(2) *Aspergillus oryzae*
(3) *Pencillium piscarium*
(4) *Pullularia*

The agar nutrient, containing the test compound, was inoculated with the test organisms by streaking the nutrient surface with a sterile wire loop which had been dipped into a tube containing a culture of the test organism.

The ability of the compounds to inhibit the growth of fungi was rated according to the following designations:

(5) No growth
(4) Slight growth
(3) Moderate growth
(2) Heavy growth
(1) Severe growth equal to control

| Compound Evaluated | Test Organism | Rating |
|---|---|---|
| Sodium 4,7-dioxa-1,10-bis-(dithiocarbamato)decane at a concentration of: | | |
| 1000 parts per million | *Fusarium gladiola* | 5 |
|  | *Aspergillus oryzae* | 5 |
|  | *Penicillium piscarium* | 5 |
| 100 parts per million | *Fusarium gladiola* | 5 |
|  | *Aspergillus oryzae* | 5 |
|  | *Penicillium piscarium* | 4 |
| 4,7-dioxa-1,10-diisothio-cyanato-decane at a concentration of: | | |
| 1000 parts per million | *Fusarium gladiola* | 5 |
|  | *Aspergillus oryzae* | 5 |
|  | *Penicillium piscarium* | 5 |
| 100 parts per million | *Fusarium gladiola* | 4 |
|  | *Aspergillus oryzae* | 5 |
|  | *Penicillium piscarium* | 5 |
| 4,12-dioxa-1,15-diisothio-cyanato-pentadecane at a concentration of: | | |
| 1000 parts per million | *Fusarium gladiola* | 5 |
|  | *Aspergillus oryzae* | 4 |
|  | *Penicillium piscarium* | 5 |
| 100 parts per million | *Fusarium gladiola* | 3 |
|  | *Aspergillus oryzae* | 4 |
|  | *Penicillium piscarium* | 5 |
|  | *Pullularia* | 5 |
| 4-oxa-1,7-diisothiocyanato-heptane at a concentration of: | | |
| 1000 parts per million | *Fusarium gladiola* | 5 |
|  | *Aspergillus oryzae* | 5 |
|  | *Penicillium piscarium* | 5 |
| 100 parts per million | *Fusarium gladiola* | 5 |
|  | *Azpergilluz oryzae* | 5 |
|  | *Penicillium piscarium* | 5 |
|  | *Pullularia* | 5 |

EXAMPLE 1

Preparation of Sodium 4,7-dioxa-1,10-bis-(dithiocarbamato)Decane

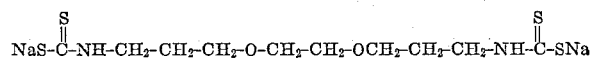

A mixture of 176 grams (1.0 mole) of 4,7-dioxa-1,10-diaminodecane, 80 grams (2 moles) of sodium hydroxide as an 85 percent aqueous solution, and 250 milliliters of water was prepared and maintained at a temperature of 0° C. in a one liter flask. To this mixture was then added 160 grams (2.1 moles) of carbon disulfide having a temperature of 0° C. The resultant mixture was heated to a temperature of 100° C., and maintained at this temperature for a period of 15 minutes. At the end of this reaction period the reaction mixture was cooled in an ice bath and the product, sodium 4,7-dioxa-1,10-bis(dithiocarbamato)decane was recovered by filtration.

In a manner as described in Example 1, the following compounds were prepared:

(a) Sodium 4,12-dioxa-1,5-bis(dithiocarbamato)pentadecane by substituting 1.0 mole of 4,12-dioxa-1,15-diaminopentadecane for the 1.0 mole of 4,7-dioxa-1,10-diaminodecane used in Example 1.

(b) Sodium 2,2 - bis[p(3 - dithiocarbamatopropoxy)phenyl]propane by substituting 1.0 mole of 2,2-bis[p(3-aminopropoxyphenyl]propane for the 1.0 mole of 4,7-dioxa-1,10, diaminodecane used in Example 1.

(c) Sodium 4,7,10 - trioxa - 5,9 - dimethyl - 1,13 - bis-(dithiocarbamato)tridecane by substituting 1.0 mole of 4,7,10-trioxa-5,9-dimethyl-1,13-diaminotridecane for the 1.0 mole of the 4,7-dioxa-1,10-diaminodecane used in Example 1.

(d) Sodium 1,2,3,4,5,6 - hexa(3 - dithiocarbamatopropoxy)cyclohexane by substituting 0.30 mole of 1,2,3,-4,5,6-hexa(3-aminopropoxy)cyclohexane for the 1.0 mole of 4,7-dioxa-1,10-diaminodecane used in Example 1.

(e) Sodium tetra(3 - dithiocarbamatopropoxymethyl)methane by substituting 0.48 mole of tetra(3-aminopropoxymethyl)methane for the 1.0 mole of 4,7-dioxa-1,10-diaminodecane used in Example 1.

(f) Potassium 4,7-dioxa-1,10-bis(dithiocarbamato)-decane by substituting 2 moles of potassium hydroxide for the 2 moles of sodium hydroxide used in Example 1.

(g) Calcium 4,7 - dioxa-1,10-bis(dithiocarbamato)decane by substituting 2 moles of calcium hydroxide for the 2 moles of sodium hydroxide used in Example 1.

EXAMPLE 2

Preparation of 4,7-Dioxa-1,10-Di(Isothiocyanato) Decane

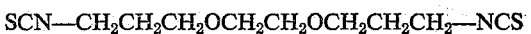

A mixture of 372 grams (1 mole) of sodium 4,7-dioxa-1,10-bis(dithiocarbamato)decane, 80 grams (2 moles) of sodium hydroxide, and 300 milliliters of water was prepared. To this mixture was then added 216 grams (2.0 moles) of ethyl chloroformate, and the mixture was stirred for a period of 2 hours at a temperature of 25° C. During this period of stirring, an oil layer formed on the surface of the mixture. This oil layer was separated by decantation and was purified by distillation in a conventional manner. The product, 4,7-dioxa-1,10-di(isothiocyanato)decane, was obtained in an 81.8 percent yield and had the following properties:

| | |
|---|---|
| Refractive index, $n^{30}/D$ | 1.5383 |
| Boiling point at 1.3 mm. pressure ° C. | 181–185 |
| Specific gravity at 20° C./20° C. | 1.1400 |
| Carbon analysis: | |
| Calculated percent | 46.20% |
| Found do | 47.07% |
| Hydrogen analysis: | |
| Calculated percent | 6.16% |
| Found do | 6.06% |
| Nitrogen analysis: | |
| Calculated percent | 8.44% |
| Found do | 9.21% |

In a manner similar to that described in Example 2, 2,2 - bis[p(1 - isothiocyanato-3-propoxy)phenyl]propane was prepared by substituting 1.0 mole of 2,2-bis[p(1-amino-3-propoxy)phenyl]propane for the 1.0 mole of 4,7-dioxa-1,10-diaminodecane used in Example 2.

EXAMPLE 3

Preparation of 4,12 - Dioxa-1,15-Di(Isothiocyanato)-Pentadecane

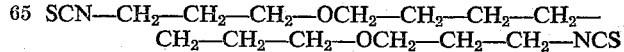

A mixture of 41 grams (0.166 mole) of 4,12-dioxa-1,15-diaminopentadecane, 20.9 grams (0.332 mole) of potassium hydroxide, and 42 milliliters of water was prepared and maintained at a temperature of 0° C. To this mixture was then added 30.4 grams (0.4 mole) of carbon disulfide having a temperature of 0° C. The resultant mixture was heated to a temperature of 100° C. and then allowed to cool to room temperature, whereupon 35.8 grams (0.332 mole) of ethyl chloroformate was added, and the mixture was stirred for a period of two hours at a temperature of 25° C. During this period of stirring, an oil layer formed on the surface of the mixture. This oil layer was separated by decantation and treated with 20.9 grams (0.33 mole) of potassium hydroxide as an 85 percent aqueous solution. The oil layer was separated from the hydroxide solution by decantation and was purified by distillation in a conventional manner. The product, 4,12 - dioxa-1,15-di(isothiocyanato)pentadecane was recovered as a residue, in an 81 percent yield, and had the following properties:

Refractive index $n^{30}/D$ _____ 1.4985.
Color/state _____ Slightly yellow. Liquid.
Carbon analysis:
  Calculated _____ 5.46%.
  Found _____ 56.74%.
Hydrogen analysis:
  Calculated _____ 87.88%.
  Found _____ 88.73%.
Nitrogen analysis:
  Calculated _____ 8.48%.
  Found _____ 7.03%.

In a manner similar to that described in Example 3, 1,2,3,4,5,6 - hexa(3 - isothiocyanatopropoxy)cyclohexane was prepared by substituting 0.055 mole of 1,2,3,4,5,6-hexa(3-aminopropoxy) cyclohexane for the 0.166 mole of 4,12 - dioxa - 1,15 - diaminopentadecane used in Example 3.

EXAMPLE 4

Preparation of 4,7,10 - Trioxa-5,9 - Dimethyl-1,13-Di-(Isothiocyanato)Tridecane

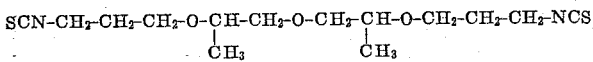

A mixture of 744 grams (3.0 moles) of 4,7,10-trioxa-5,9-dimethyl - 1,13 - diaminotridecane, 395 grams (6.0 moles) of potassium hydroxide, and 490 milliliters of water was prepared and maintained at a temperature of 0° C. in a one liter flask. To this mixture was then added 463 grams (6.1 moles) of carbon disulfide having a temperature of 0° C. The resultant mixture was heated to a temperature of 100° C. and then allowed to cool to room temperature, whereupon 648 grams (6.0 moles) of ethyl chloroformate was added and the mixture was stirred for a period of two hours at a temperature of 25° C. During this period of stirring, an oil layer formed on the surface of the mixture. This oil layer was separated by decantation and treated with 395 grams (6.0 moles) of potassium hydroxide as an 85 percent aqueous solution. The product, 4,7,10-trioxa-5,9-dimethyl-1,13-di(isothiocyanato)tridecane, was recovered in the same manner as described in Example 2 as a distillate residue, in a yield of 80.4 percent. The product had the following properties:

Refractive index $n^{30}/D$ _____ 1.5158.
Specific gravity 20° C./20° C. _____ 1.0968.
Color/state _____ Yellow liquid.
Carbon analysis:
  Calculated _____ 50.7%.
  Found _____ 51.14%.
Hydrogen analysis:
  Calculated _____ 7.23%.
  Found _____ 7.04%.
Nitrogen analysis:
  Calculated _____ 8.44%.
  Found _____ 9.21%.

In a manner similar to that described in Example 3, tetra(3-isothiocyanatopropoxymethyl)methane was prepared by substituting 1.5 moles of tetra(3-aminopropoxymethyl)methane for the 3.0 moles of 4,7,10-trioxa-5,9-dimethyl-1,13-diaminotridecane used in Example 4.

EXAMPLE 5

Preparation of 4-Oxa-1,7-Di(Isothiocyanate)Heptane

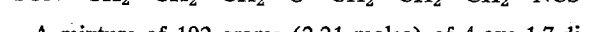

A mixture of 192 grams (2.21 moles) of 4-oxa-1,7-diaminoheptane, 292 grams (4.42 moles) of potassium hydroxide, and 584 milliliters of water was prepared and maintained at a temperature of 0° C., in a one liter flask. To this mixture was then added 343 grams (4.52 moles) of carbon disulfide having a temperature of 0° C. The resultant mixture was heated to a temperature of 100° C. and then allowed to cool to room temperature, whereupon 478 grams (4.42 moles) of ethyl chloroformate was added and the mixture was stirred for a period of two hours at a temperature of 25° C. During this period of stirring, an oil layer formed on the surface of the mixture. This oil layer was separated by decantation and treated with 292 grams (4.42 moles) of potassium hydroxide as an 85 percent aqueous solution. The product, 4-oxa-1,7-di(isothiocyanato)heptane was recovered in the same manner as described in Example 2, as a distillate residue in a yield of 71.4 percent. The product had the following properties:

Refractive index $n^{30}/D$ _____ 1.5497
Boiling point at a pressure
  of 3.3 mm./Hg _____ °C__ 178
Specific gravity 20° C./20° C. _____ 1.1463
Carbon analysis:
  Calculated _____ Percent__ 44.5
  Found _____ do____ 45.03
Hydrogen analysis:
  Calculated _____ Percent__ 5.56
  Found _____ do____ 5.33
Nitrogen analysis:
  Calculated _____ Percent__ 12.95
  Found _____ do____ 12.88

4-oxa-1,7-di(isothiocyanato)heptane was prepared by the alternate procedure consisting of dissolving 192 grams (1.0 mole) of 4-oxa-1,7-diaminoheptane in 1000 grams of benzene, and sparging the solution with thiophosgene at a rate of 1.0 mole per mole equivalent of amine per hour for a period of 12 hours at a temperature of 150° C. and recovering the product, 4-oxa-1,7-di(isothiocyanato)heptane from the benzene solution as a distillate residue.

What is claimed is:
1. A compound of the formula:

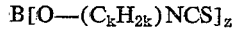

wherein $k$ is an integer having a value of from 1 to 10 inclusive, $z$ is an integer having a value of from 2 to 6 inclusive, and B is a polyvalent aromatic hydrocarbon group containing from 6 to 14 carbon atoms inclusive.

2. A compound of the formula:

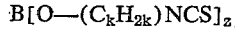

wherein $k$ is an integer having a value of from 2 to 5 inclusive, $z$ is an integer having a value of from 2 to 4 inclusive, and B is a polyvalent aromatic hydrocarbon group containing from 6 to 10 carbon atoms inclusive.

3. 2,2 - bis[p - (3-isothiocyanatopropoxy)phenyl]propane.

References Cited by the Examiner

UNITED STATES PATENTS

| | | | |
|---|---|---|---|
| 2,042,600 | 6/36 | Hilger et al. | 260—454 |
| 2,214,971 | 9/40 | Muller | 260—454 |
| 2,374,136 | 4/45 | Rothrock | 260—454 |

(Other references on following page)

UNITED STATES PATENTS

| | | | |
|---|---|---|---|
| 2,439,514 | 4/48 | Herndon | 260—454 |
| 2,462,433 | 2/49 | Searle | 260—454 |
| 2,847,441 | 8/58 | Melamed | 260—454 |
| 2,859,236 | 11/58 | Schmidt et al. | 260—454 |
| 2,866,804 | 12/58 | Nischk et al. | 260—454 |
| 2,910,498 | 10/59 | Meuly | 260—455 |
| 2,972,627 | 2/61 | Garrmaise et al. | 260—455 |

FOREIGN PATENTS

| | | |
|---|---|---|
| 898,899 | 12/53 | Germany. |
| 656,643 | 8/51 | Great Britain. |
| 707,589 | 4/54 | Great Britain. |

OTHER REFERENCES

Conant et al.: "The Chemistry of Organic Compounds," Fourth Edition, page 335 (1956).

Dyson et al.: "J. Chem. Soc." (London), volume of 1942, pages 374–375.

Horsfall: "Principles of Fungicidal Action," page 185 (1956).

Houben-Weyl: "Methoden der Organischen Chemie," Volume 9, pages 875–876 (1955).

McKee et al.: "J.A.C.S.," Volume 68, pages 2506–2507 (1946).

CHARLES B. PARKER, *Primary Examiner.*